United States Patent
Wautier et al.

(10) Patent No.: US 10,643,442 B2
(45) Date of Patent: May 5, 2020

(54) VIDEO MONITORING SYSTEM

(71) Applicant: WITHINGS, Issy les Moulineaux (FR)

(72) Inventors: Edouard Wautier, Levallois (FR); Cedric Hutchings, Issy les Moulineaux (FR); Leo Germond, Paris (FR); Amaury Dumoulin, Neuilly sur Seine (FR); Yoni Soleiman, Paris (FR)

(73) Assignee: WITHINGS, Issy les Moulineaux (FR)

( * ) Notice: Subject to any disclaimer, the term of this patent is extended or adjusted under 35 U.S.C. 154(b) by 380 days.

(21) Appl. No.: 14/732,252

(22) Filed: Jun. 5, 2015

(65) Prior Publication Data

US 2016/0358436 A1 Dec. 8, 2016

(51) Int. Cl.
*H04N 7/18* (2006.01)
*G08B 13/196* (2006.01)
*G11B 27/031* (2006.01)
*G11B 27/10* (2006.01)
*G11B 27/28* (2006.01)

(52) U.S. Cl.
CPC ...... *G08B 13/19667* (2013.01); *G11B 27/031* (2013.01); *G11B 27/102* (2013.01); *G11B 27/28* (2013.01); *H04N 7/18* (2013.01); *G08B 13/19602* (2013.01); *G08B 13/19684* (2013.01)

(58) Field of Classification Search
CPC ........ G08B 13/19658; G08B 13/19667; G08B 13/19682; G08B 13/19684; H04N 7/18; G11B 27/30
See application file for complete search history.

(56) References Cited

U.S. PATENT DOCUMENTS

| | | | | |
|---|---|---|---|---|
| 4,167,019 A | * | 9/1979 | Shepperd | A63F 13/10 345/634 |
| 6,711,470 B1 | * | 3/2004 | Hartenstein | F24F 11/30 700/276 |
| 7,113,090 B1 | * | 9/2006 | Saylor | G08B 13/19682 340/5.33 |
| 2006/0070108 A1 | | 3/2006 | Renkis | |
| 2006/0104345 A1 | * | 5/2006 | Millar | G08B 13/19667 375/240.01 |
| 2006/0279628 A1 | * | 12/2006 | Fleming | G11B 27/034 348/143 |
| 2008/0036862 A1 | | 2/2008 | Lang | |
| 2011/0135171 A1 | * | 6/2011 | Galigekere | G06T 7/0012 382/128 |
| 2013/0188054 A1 | * | 7/2013 | Weinblatt | H04N 7/18 348/159 |

* cited by examiner

*Primary Examiner* — Md N Haque
(74) *Attorney, Agent, or Firm* — Miller, Matthias & Hull LLP

(57) ABSTRACT

A method implemented in a video monitoring system comprising a video camera, a server one or more portable electronic device such as a smartphone or tablet, the method comprising: a—capturing images and determine content change, b—calculate an activity level, with a content change index and a noise index, c—calculate an image storing rate, d—store, at storing rate, time-stamped images, e—transmit time-stamped images to the server, f—build, at the server, a video sequence forming a summary of a predefined past period of time, to be displayed, upon user demand, on the portable electronic device.

13 Claims, 4 Drawing Sheets

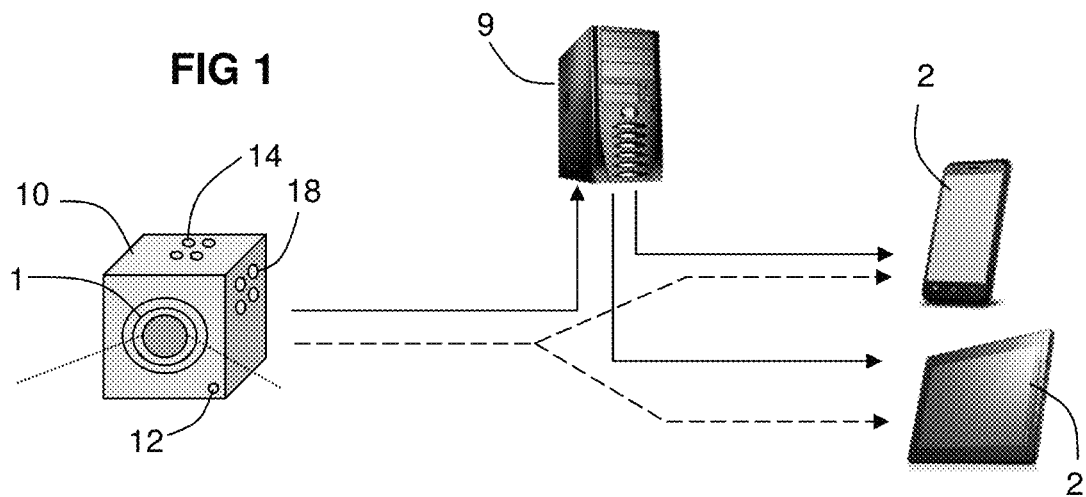
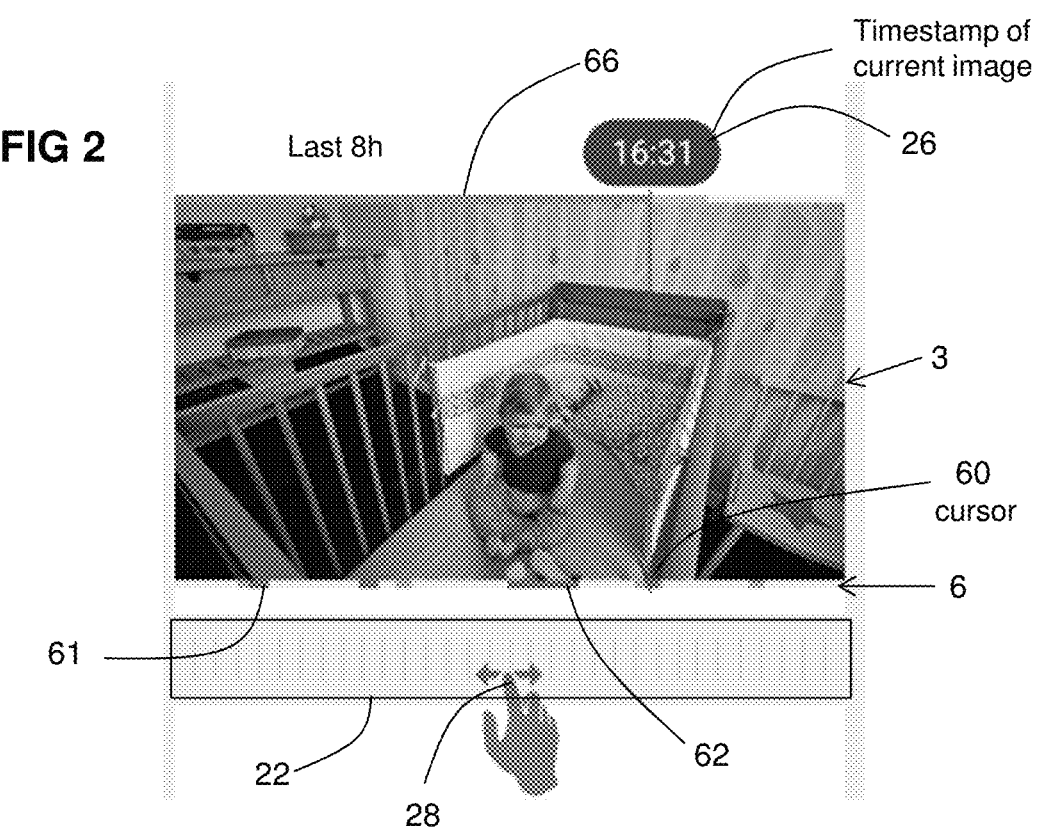

VIDEO MONITORING SYSTEM

BACKGROUND

Technical Field

This disclosure concerns video monitoring systems and methods used to monitor scenes, in particular home scenes, for example to monitor what may happen at home when people a at work, or away from home.

Description of the Related Art

In the known art, one or more video cameras are placed in a location or premises; such video cameras are configured to send images to a control computer having a mass storage unit and coupled to one or more video monitors video cameras are configured to capture images (or video clips) either permanently or upon movement detection triggering.

In some case, there is a human operator looking in real time at the video monitors, like in surveillance systems for department stores or other public premises.

However, in many cases, the captured images (or video clips) are not watched in real time, but in a delayed manner. One of such example is a private home video monitoring system; in this case, one or more video cameras are placed in home room(s), and images are captured and stored at least when the inhabitants are not present at home; later in the day or the day(s) after, the images are played back and watched by the owner or tenant of the home. As known, this requires high memory spaces to store images and furthermore the play back and reviewing procedure is time consuming.

There have been attempts to reduce the required size of stored images by compressing images, however this entails a loss in quality and possibly blurred images. Also, in order to review rapidly the captured images/videos, it is proposed fast forward reading, but this entails a risk of missing an important event.

Therefore, there is a need to bring new solutions to optimize video monitoring systems, especially for private home video monitoring systems, as per capture and replay of images.

SUMMARY OF THE DISCLOSURE

According to a first aspect of this disclosure, it is provided a video monitoring system, especially for a private home, comprising:

a video camera capturing images and storing time-stamped images in a file at a varying adaptive rate, said rate being made dependent on images content deviation and environmental sensors) data, a server (or a cloud service), to receive resulting images, a smartphone configured to display an activity time line over one or more predefined past period of time (such as last 10 h, last 8 h, last 6 h), together with a cursor in the activity time line, said cursor can be moved by a user's finger drag, and an image corresponding to the current position of the cursor within the activity time line.

Whereby, there is provided a simple way for a user (home tenant) to have a fast review of what happened at home during the predefined past period of time. And additionally, the size of the data transmitted from the video camera toward the server and the smartphone is substantially limited.

It should be understood that, instead of a smartphone, any more generally speaking portable electronic device can also be used (such as a tablet, a phablet, a PDA, a laptop computer, or any like wireless-and-graphic enabled device).

In various embodiments of the invention, one may possibly have recourse in addition to one and/or other of the arrangements, which can be found in the dependent claims.

According to a second aspect of this disclosure, it is proposed a method implemented in a video monitoring system comprising a video camera, a server one or more portable electronic device such as a smartphone or tablet, the method comprising:

a—capturing images and determine content change b—calculate an activity level, with at east an image content change index and a noise index c—calculate an image storing rate, d—store, at such storing rate, time-stamped images, e—transmit time-stamped images to the server, f—build, at the server, a video sequence forming a summary of a predefined past period of time, to be displayed, upon user demand, on the portable electronic device.

In various embodiments of the invention, one may possibly have recourse in addition to one and/or other of the arrangements, which can be found in the dependent claims.

The features, functions, and advantages discussed above may be achieved independently in various embodiments or be combined in yet other embodiments, further details of which can be seen with reference to the following description and drawings.

BRIEF DESCRIPTION OF THE DRAWINGS

For a more complete understanding of the disclosed methods and apparatuses, reference should be made to the embodiments illustrated in greater detail in the accompanying drawings, wherein:

Other features and advantages of the invention appear from the following detailed description of one of its embodiments, given by way of non-limiting example, and with reference to the accompanying drawings, in which:

FIG. 1 shows a video monitoring system according an exemplary embodiment of this disclosure, FIG. 2 illustrates a replay mode on a smartphone.

Figure 3:
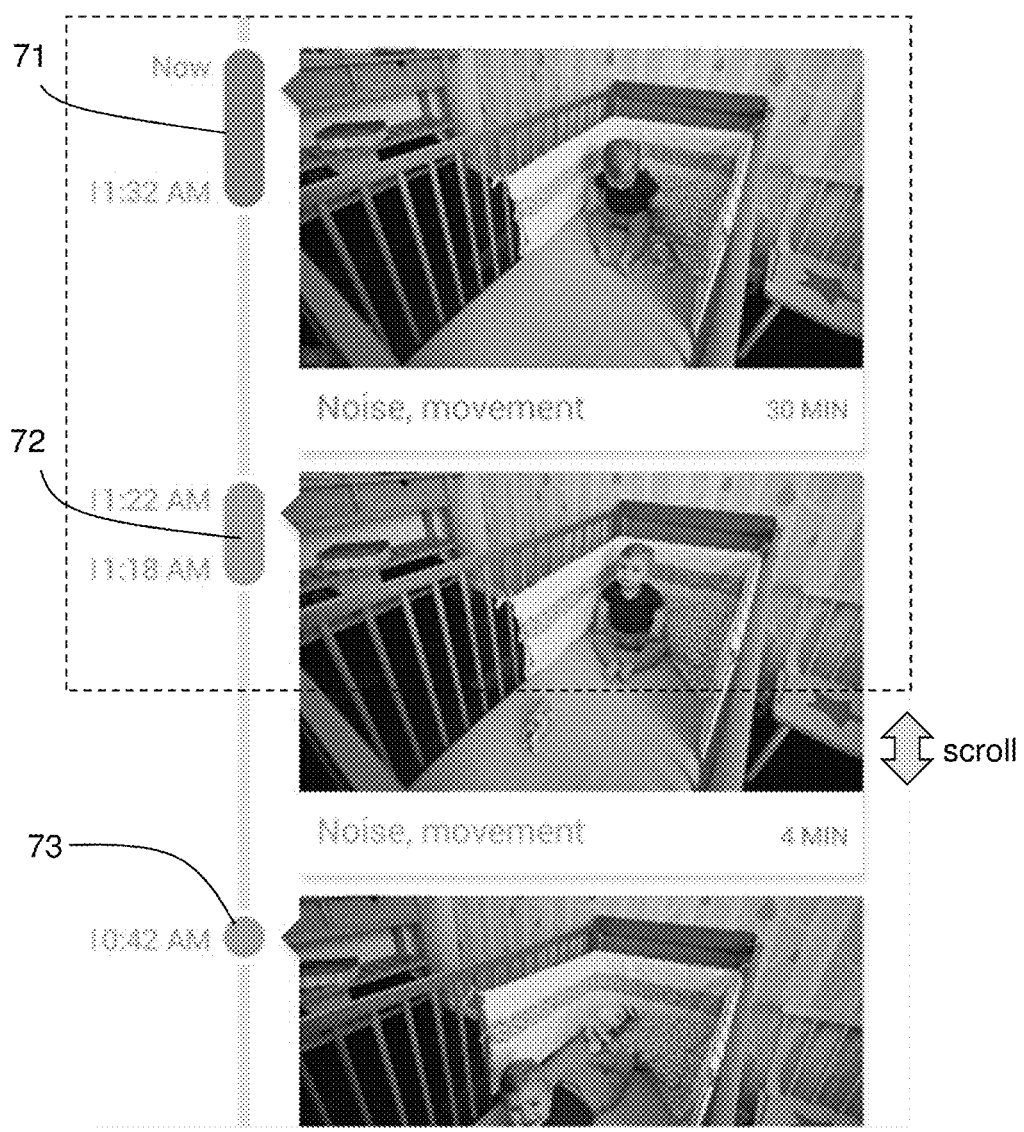
FIG. 3 illustrates another replay mode on a smartphone.

The drawings are not necessarily to scale and illustrate the disclosed embodiments diagrammatically and in partial views. In certain instances, this disclosure may omit details which are not necessary for an understanding of the disclosed methods and apparatuses or which render other details difficult to perceive. Further, this disclosure is not limited to the particular embodiments is illustrated herein.

DETAILED DESCRIPTION OF THE PRESENTLY PREFERRED EMBODIMENTS

In the figures, the same references denote identical or similar elements.

FIG. 1 shows a video monitoring system comprising a video camera 1 installed in the home of a family, a server 9 located remotely, and a smartphone or tablet 2. As stated before, the smartphone or tablet can be more generally any portable electronic device 2.

There may be more than one video camera, for example one in different rooms of the house/flat. There may be more than one portable electronic device, for example a smartphone used by the father of the family, and another smartphone used by the mother of the family.

In the following, a home 'tenant' stands for a person responsible for the home, usually an adult, owner or lodger of the home. The home 'tenant' wants, for security and safety reasons, to be able to keep an eye on what happens or happened at home when he/she is absent from home. This relates to monitoring material things as well as living beings. At home there can be different kind of living beings to monitor, human beings like young children or very old people, but also domestic worker(s), delivery personnel, and also pets, birds, and the like.

There may be more than one server 9, or more generally cloud service.

As illustrated in FIGS. 1-6, the video camera 1 is preferably a wide-angle camera, with a wide-angle optical system smith rectilinear correction. Preferably, the viewing angle is at least 135°. The video camera 1 is housed in an assembly 10, which also comprises environmental sensor(s), in particular an air quality sensor 18, a temperature sensor 23 and a noise sensor. The noise sensor can be a microphone 12.

It should be noted that 'environmental sensor(s) data' includes data from all other sources than the camera capturing images. 'environmental sensor(s) data' encompasses air quality data, sound, noise, temperature, and so on.

There may be provided as well a loudspeaker 14 to enable a bidirectional communication (voice duplex link with smartphone or tablet 2).

The video camera 1 has a controller 16, a memory 17, infrared LEDs 29 for night illumination at dark conditions, and a wireless coupler 13.

The video camera 1 assembly 10 is powered by a mains adapter (not shown); however, it can be supplied by a conventional battery or a rechargeable battery 8.

The video camera 1 is equipped with a CMOS sensor 11 to capture image as known per se.

Image Analysis and Activity Level

Advantageously, the controller 16 continuously calculates an activity level 4 (also called 'activity rating' or 'activity index'), based on images content changes and environmental sensor(s) data. The activity level is based at least on image changes and sound More precisely, for example, this activity level has a low value when no change occurs in successive images and no noise is perceived on the microphone; this activity level increases whenever changes occur in successive images or whenever substantial noise is perceived on the microphone.

This activity level may be a counter on 1 byte, comprised between 0 à 255, possibly handled by counter increment(s) or decrements) according to the detection of events as explained in detail below.

Images are captured (i.e. sampled) at a usual rate for video capture, for example at a rate of 24 images per second. However, the standard capture/sampling rate can be slower or faster. This capture step is denoted step /a/ of the method.

A new captured image 3 is compared to one or several previous images.

Figure 5:
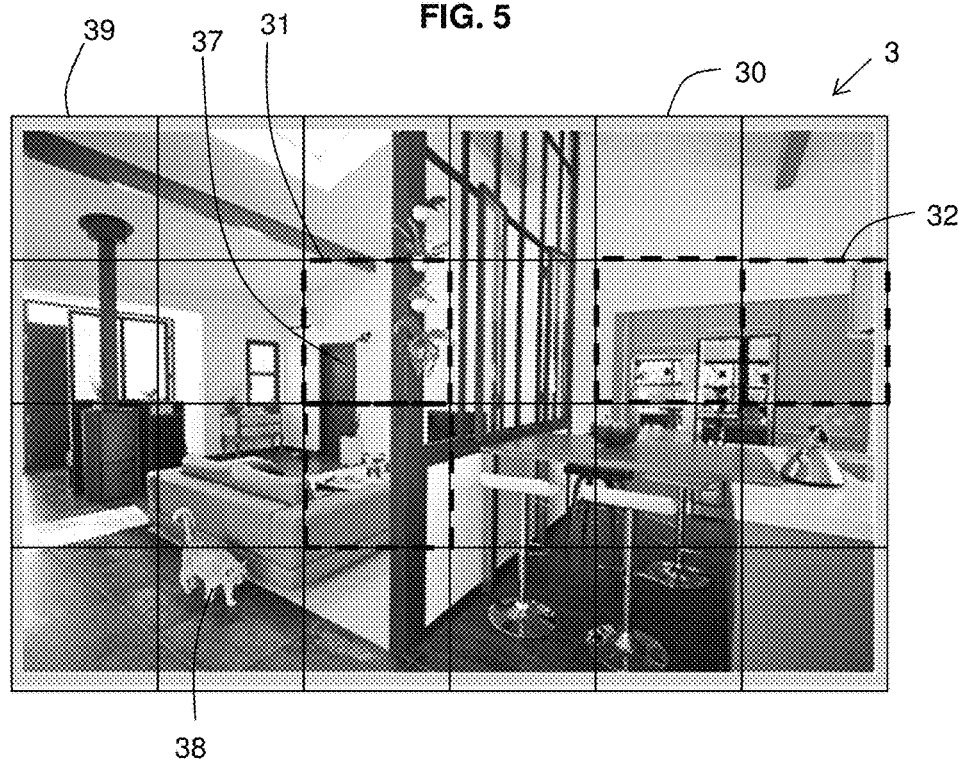
FIG. 5 shows a capturing camera optical field with segmentation.
Figure 6:
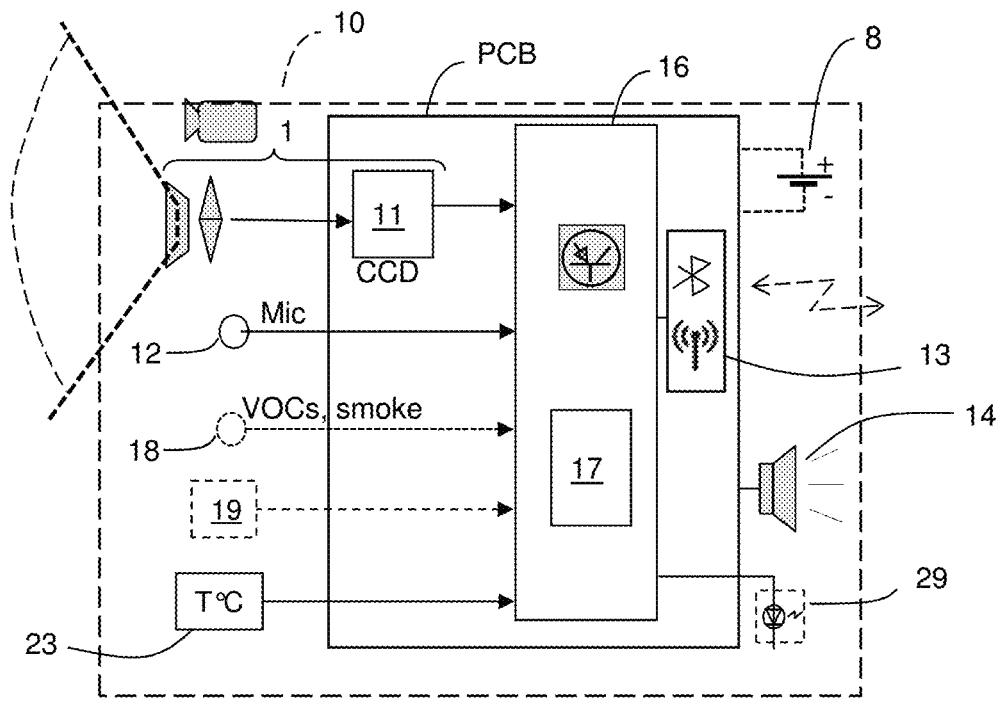
FIG. 6 shows a block diagram of the video camera assembly.
Figure 7:
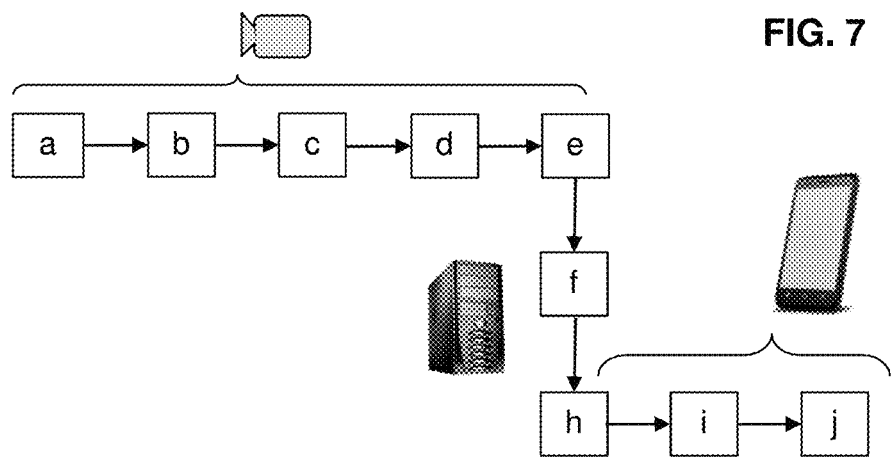
FIG. 7 illustrates the steps of the method.

The image 3 is advantageously partitioned into a plurality of sub-images 30, as shown in FIG. 5. In order to make the image analysis process more efficient, in a recurrent manner, each sub-image is analyzed with regard to the previous sub-image at the same location. This allows to easily disregard sub-images where nothing moves. In addition, this sub-image partition allows to allocate specific sensitivity to change analysis as it will be explained below.

Each sub-image 30 can have a different weight; for example sub-images 31,32 comprising a door 37 will have a greater weight, whereas a sub-image 39 comprising only ceiling will have a lower weight (lower likelihood to have something occurring at this sub-image).

Some sub-image(s) can have a very low weight or even a 0 weight to exclude particular cases where changes normally occur, for example, a fish in an aquarium, a bird in a cage, a moving cat 38, and a small pet in a cage. The same can apply to transparent window with trees and/or leaves outside moving in the wind.

According to one implementation, the weight of each sub window 30 can be defined by the user with the help of a configuration application of the smartphone; the list of weights is then transmitted to the video camera for local computation.

According to another implementation, the weight of each sub window 30 can be defined by a learning procedure, that-is-to-say an automated procedure without necessary user involvement. According to this mode, high activity sub-image(s) are allocated with a lower weight, or even a gradually lowering weight.

A movement index can be computed e comparing sub-images of the new captured image is compared to the corresponding sub-images of the N previous images, N being comprised between 1 and 5, and with the weight of each sub-image taken into account accordingly.

Some movements detected as recurrent movements can be excluded; also, movements generated by the optics may be excluded; also, movements generated by normal changes in ambient light can be excluded. As for recurrent movements one can cite the movement of tree leaves through the window, the movement of the hands of a wall clock, etc. . . .

A noise index can be computed from the microphone signals analysis. Microphone signals reflect not only sounds corn from the home interior but also sounds coming from outside.

Some recurrent special noises can be excluded intentionally to limit the number of false alarms, for example, a cookoo clock inside the home, or noises coming from outside, firemen sirens, car horns, etc. . . .

Further, optionally, an air quality index can be also computed, from the environmental data obtained from the air quality sensor 18; this sensory data can include a smoke level, volatile organic compounds (VOCs) level, etc. . . . Regarding VOCs, some organic compounds can be released by cosmetics, cleaning products, fresh paint, new piece of furniture, they can include aldehydes, formaldehyde, methylene, toluene, acetone, butane, pentane, benzene or the like.

In addition, the air quality sensor 18 or an additional sensor is configured to sense the level CO2 concentration and the level of CO concentration in the room.

The noise (if any) generated by the device itself are excluded from the analysis, especially the sound(s) emitted by the loudspeaker 14 of the device itself.

Additionally, there may be provided an accelerometer 19, with acceleration signals can also be taken into account in the activity level calculation, for example in case a small earthquake may happen, or if the device is moved to another location.

In one illustrated example, the activity level 4 is defined as an aggregate index and is computed at least from the above mentioned movement index noise index and possibly other parameters like pollutants detection, smoke detection, temperature, etc. . . . The complete activity level calculation is referred to as step /b/ of the method.

Alternatively, there may be not a single activity level, but a plurality of specific activity levels like on for the image changes, one for the perceived noise, and one for the VOCs.

There may be defined one or more thresholds for activity levels, for example, a medium level threshold 44, and a high-level threshold 45.

If the current activity level exceeds the high-level threshold 45 (at illustrated at time T1, T2), a notice 48 may be sent immediately and directly from the video camera 1 to the smartphone 2.

The rate at which the notices are sent can be capped in order not to be too intrusive.

Adaptive Storing Rate

Figure 4:
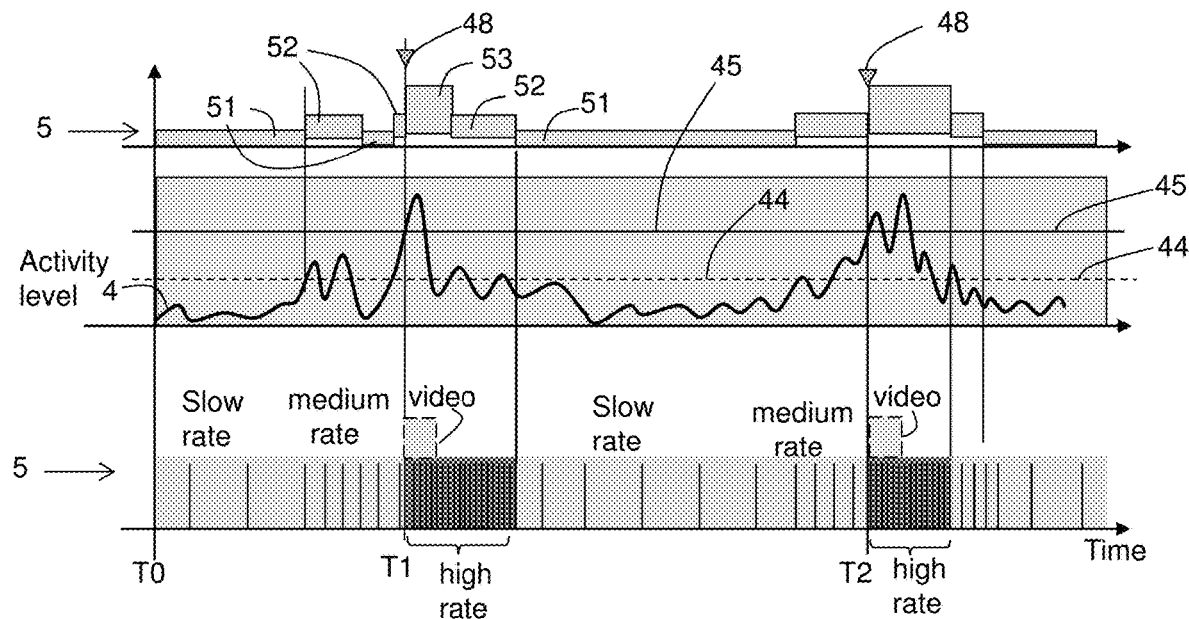
FIG. 4 shows a time chart relative to activity level adaption.

With the activity level(s), an image-storing rate 5 is inferred from the continuously computed activity level. It is a real-time adaptive storing rate, it may continuously evolve over time, as shown in FIG. 4. The adaptive storing rate calculation is referred to as step /c/ of the method.

The controller 16 stores time-stamped images in memory 17, according to the computed storing rate 5 (referred to as step /d/ of the method).

As a very simple example, a slow storing rate 51 prevails when the activity level remains below the activity medium threshold 44. A medium storing rate 52 prevails whenever the activity level exceeds the activity medium threshold 44. In addition, a high storing rate 53 prevails whenever the activity level exceeds the activity high threshold 45.

Stepping back to a slower storing rate can be time smoothed, i.e. stepping back to the slow storing rate 51 may require at least a certain time when the activity level remains below the activity medium threshold 44.

Otherwise, there may be any kind of filtering, digital filter, time filtering, to smooth if appropriate the storing rate change versus activity level.

To give only one example, the slow storing adaptive rate can be about 1 image per 5 minutes, which means, for the size required to store the images; the medium storing rate can be about 1 image per 20 seconds.

The high storing rate can be about 1 image per second.

The stored images are to be transmitted to a remote unit (server, smartphone) and therefore, if the required bit rate are compared to a full video sampling at 24 imgs/sec, the required bit rate corresponding respectively to the slow/medium/high storing rate decreased by a respective factor of 7200/480/24. Advantageously, this gain in overall data size and bit rate enables the device to capture high definition images, as it will be detailed later.

The transmission bit rate of data is therefore generally substantially decreased.

The CMOS sensor can have a substantially high definition. In the shown example, the CMOS sensor is able to capture typically 5 megapixels color images, it can also be 3 megapixels images, 2 megapixels images, without excluding a lower definition like 1 280×1 024 pixels or lower.

The image 3 can be partitioned, as illustrated, in 6×4 arrays of sub-images 30. In practical, it is preferred to have a more refined partition with more sub-images of each 40×40 pixels, which means a 32×24 array of sub-images from a 1280×960 pixels definition.

Each stored image can be compressed to a JPEG format, which allows to minimize the size of each image, as known per se, with a compression rate ranging from 3 to 20 or even more.

Advantageously, the video camera transmits the stored time-stamped images to the server 9, rather frequently.

According to one option, images are transmitted as soon as they are stored, which allows a nearly real time viewing at the end of the smartphone. Alternatively, the transmission can be made from time to time, by packets, to reduce the number of access to the network. This transmission can also be done on a periodic basis and additionally each time 48 a notice is sent to the user. The transmission is referred to step /e/ of the method.

In a particular embodiment, in the slow and medium storing rates, the transmission to the server occurs each time an image is stored, that-is-to-say one image is sent at a time. Otherwise, several images can be sent at a time, for example when high storing rate prevails. Said several images may be arranged one after the other in a file.

Consequently, the memory size in the video camera 1 for capturing, storing and forwarding the images can be limited to less than 200 Kbytes, even less than 100 Kbytes.

Therefore, the memory space required inside the video camera device is rather low, and its cost is low.

Optionally, in an optional variant of the video camera 1, there may be provided a standard video capture feature. In this case, as illustrated in FIG. 4, each time the high level of activity is detected the camera captures and processes a 24 images/second video clip having a duration comprised between 20 s and 60 s.

The resulting video is compressed using a CODEC processing as known per se. For example, the video can be compressed using MPEG-4 format before being sent to the server.

The MPEG-4 format resulting video, having a size comprised between 500 Kbytes and 1.5 Mbytes can be split in several packets to be sent to the server. According to this full video option, the memory space required inside the video camera remains below 2 Mbytes, preferably below 1 Mbytes.

Further, such MPEG-4 format resulting video is sent without delay, so that the user can review the captured event on the smartphone nearly immediately.

In the absence of a proper network operation, the emission of video/images can be delayed, allowing for resilience to short network disturbances or failures.

Since the server 9 receives stored time-stamped images from the video camera device, the server is able to build a video sequence forming a summary of a predefined past period of time. Said video sequence (also known as "time-lapse" sequence) is intended to be displayed, upon user demand, on the portable electronic device 2.

Said video sequence is obtained at the server by appending all received images in the chronological order, this constitutes a "summary" of what has happened at home.

This summary includes all the received images in the previous predefined past period of time up to the present moment. The process of building such "time-lapse" sequence is referred to step /f/ of the method.

Such "time-lapse" sequence can then be transferred to the portable electronic device 2 for user reviewing (step /h/ of the method).

The predefined past period of time can be default options such as last 10 h, last 8 h, last 6 h, last 4 h, it can also be user defined via a specific feature of the application on the smartphone.

At the smartphone, as shown in FIG. 2, the summary of a predefined past period of time is displayed with an image 3 displayed in the center, an activity time line 6 displayed horizontally below the image, and a scrolling interface 22 below the activity time line 6.

According to one option, the user can review the full video sequence forming a summary of a predefined past period of time, this is also referred to as a 'time-lapse' video sequence. According to another option, the user can use a cursor 60 to point to a particular portion of the video or even review images on a one image per image basis.

In the shown example, the activity time line 6 is chronological, from the start of the predefined period on the left to the end of the predefined period on the right. The cursor 60 comprises a color line overlaid on the activity time line, and the image 3 displayed in the center corresponds to the image captured at the time shown above the cursor line, i.e. the time stamp 26 of the current showed image.

The user can move the cursor 60 toward the left or toward the right with his/her finger 28, thereby changing the current displayed image together with the time stamp 26 of the currently showed image.

On the activity time line, there are displayed different colors, which are representative of the activity level along the predefined period. Low activity level is reflected by a light color (light green for example), and high activity level is reflected by a dark color (red or brown). There can be numerous color-coded possibilities, so that the user can see in a glimpse what are the highlights along the predefined period. On the activity time line, color can also indicate the source of image sampling trigger (one color for image, another for noise, another for VOCs, . . . ).

To enhance user intuitiveness, the cursor is completed by a progress bar 66 on the top of the displayed image 3.

According to another available display mode, as shown in FIG. 3, there is displayed a vertically arranged list of portions of the time-lapse video sequence and corresponding time stamps 71,72,73, ordered from the most recent to most ancient, each portion of the video sequence corresponding to a highlight of activity in the predefined past period of time. Here, one image per highlight is shown, the duration of the high activity level is also shown (beginning and end with timestamps). The smartphone user can scroll up and/or scroll down to review all the past highlights in the predefined past period of time.

Additionally to what was explained above with regard to the full video option, a corresponding reviewing feature is also provided at the smartphone. In such a case, the user may be provided with an option when browsing among the past highlight, in addition to the time-lapse display, to have a review of a standard video for this highlight (for example when 'Play' icon is popped up).

The user may tune the orientation of the optical lens, via the smartphone application.

Further, when reviewing the time-lapse video, there may be provided an indicative frame highlighting which encompasses the sub-images 30 that triggered the activity level increase.

It is to be noted that whenever the activity level remains in high state a long period, there may be provided a 'cool down' function, which consists in slowing on purpose the capture rate and inhibiting the full video option, for a while, say 1 minute.

The video camera 1 is housed in an assembly 10 can be placed in the living room, a bedroom, the lobby.

It should be noted that the camera can operate at daylight conditions but also in dark conditions thanks to the use of an infrared illumination 29.

According to another optional feature, thanks to the already mentioned wireless interface 13 or another specific wireless interface, another connected device (not shown at figures) in the home (for example any BlueTooth™ enabled device) can transmit an alert to the video camera 1, which can in turn forward this alert to the user portable electronic device 2.

Such additional connected device(s) can be located in the same room or in other rooms, like detectors for example.

While only certain embodiments of been set forth, alternative embodiments and various modifications will be apparent from the above description to those skilled in the art. These and other alternatives are considered equivalents and within the spirit and scope of the present disclosure.

What is claimed:

1. A video monitoring system comprising:
  a video camera unit configured to capture images and store selected captured images in memory at a varying adaptive storing rate, wherein the varying adaptive storing rate comprises selecting one storing rate among a plurality of storing rates in response to an activity level calculated from content changes in successive captured images and data from one or more environmental sensors, wherein the number of selected captured images that are stored is determined by the varying adaptive storing rate;
  a server, configured to receive the stored selected captured images from the video camera unit via a data link, the server being configured to build a video sequence forming a summary of a predefined past period of time; and
  one or more portable electronic device configured to display an activity time line of the predefined past period of time, together with a cursor in the activity time line, wherein said cursor can be moved by a user's finger drag, and an image of the video sequence corresponding to the current position of the cursor within the activity time line.

2. The system of claim 1, wherein the activity level is recurrently computed at least from image change analysis and noise analysis.

3. The system of claim 2, wherein the activity level is additionally computed with a sensed level of volatile organic compounds (VOCs).

4. The system of claim 1, wherein a currently selected adaptive storing rate is caused to be in correspondence with the activity level.

5. The system of claim 1, wherein a notice is sent toward the electronic device whenever the activity level is higher than a predefined threshold.

6. The system of claim 1, wherein each of the plurality of storing rates is comprised between 1 image per 5 minutes and 1 image per second.

7. The system of claim 1, wherein each stored image is time-stamped with the time it was captured and the stored time-stamped images are transmitted to the server on a periodic basis and additionally each time a notice is sent to the user.

8. The system of claim 1, wherein on the portable electronic device, it is displayed a vertically arranged list of portions of the video sequence and corresponding time stamps, ordered from the most recent to most ancient, each portion of the video sequence corresponding to a highlight of activity in the predefined past period of time.

9. The system of claim 1, wherein the images are captured and transmitted with a pixel definition higher than 2 megapixels.

10. A method implemented in a video monitoring system comprising a video camera unit, a server one or more portable electronic devices, the method comprising:

a—capturing images, by the video camera unit, and determining a content change index therefrom based on content changes between successive images, wherein each captured image is time-stamped with the time it was captured;

b—calculating an activity level at the video camera unit, based on the content change index and a noise index;

c—selecting, at the video camera unit, one image storing rate among a plurality of storing rates, according to the activity level;

d—storing, at the selected storing rate, selected time-stamped images, in a memory of the video camera unit, wherein the number of selected time-stamped images that are stored is determined by the selected storing rate;

e—transmitting the selected time-stamped images to the server; and f—building, at the server, a video sequence forming a summary of a predefined past period of time, configured to be displayed, upon user demand, on the one or more portable electronic device.

11. The method of claim 10, wherein the method further comprises:

g—transmitting the video sequence from the server to the one or more portable electronic device, h—at the portable electronic device, displaying an activity time line of the predefined past period of time, together with a cursor, and an image of the video sequence corresponding to the current position of the cursor within the activity time line, i—moving the cursor with a user's finger drag, and display accordingly the corresponding image, corresponding to the timestamp pointed by the cursor.

12. The method of claim 10, wherein the method further comprises:

displaying a vertically arranged list of portions of the video sequence and corresponding time stamps, ordered from the most recent to most ancient, each portion of the video sequence corresponding to a highlight of activity in the predefined past period of time.

13. The method of claim 10, wherein each of the plurality of storing rates is comprised between 1 image per 5 minutes and 1 image per second.

* * * * *